United States Patent
Kong et al.

(10) Patent No.: US 7,308,349 B2
(45) Date of Patent: Dec. 11, 2007

(54) METHOD OF OPERATION FOR A VISION-BASED OCCUPANT CLASSIFICATION SYSTEM

(75) Inventors: Hongzhi Kong, Kokomo, IN (US); John R. Bailey, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 311 days.

(21) Appl. No.: 11/145,708

(22) Filed: Jun. 6, 2005

(65) Prior Publication Data
US 2006/0276945 A1    Dec. 7, 2006

(51) Int. Cl.
*B60R 22/00* (2006.01)
*E05F 15/00* (2006.01)

(52) U.S. Cl. .......................... 701/45; 701/46; 180/268; 180/271; 280/734

(58) Field of Classification Search ................ 701/45, 701/46, 47; 180/268, 271, 272, 273; 280/734, 280/735
See application file for complete search history.

(56) References Cited

U.S. PATENT DOCUMENTS

2004/0153229 A1   8/2004  Gokturk et al.

2005/0185845 A1*  8/2005  Luo et al. .................... 382/224
2006/0253238 A1*  11/2006 Murphy et al. ............... 701/45

FOREIGN PATENT DOCUMENTS

EP         1 407 940          4/2004

OTHER PUBLICATIONS

EP Search Report dated Sep. 27, 2006.

* cited by examiner

*Primary Examiner*—Gertrude A. Jeanglaude
(74) *Attorney, Agent, or Firm*—Jimmy L. Funke

(57) ABSTRACT

A vision-based occupant classification method utilizes a static classification routine for achieving highly accurate occupant classification, a dynamic detection routine for quickly responding to changes in occupant position, and a category state change routine for detecting potential changes in occupant category. The static classification routine determines an initial classification of the occupant, after which the dynamic detection routine monitors for changes in occupant position and the category state change routine monitors for a potential change in occupant category. If category state change routine detects a potential change in occupant category, the static classification routine is re-executed to re-classify the occupant. The category state change routine identifies a composite optical flow vector associated with occupant movement, and detects a potential change in occupant category when the composite flow vector crosses one or more pre-defined entry/exit motion gates.

10 Claims, 5 Drawing Sheets

METHOD OF OPERATION FOR A VISION-BASED OCCUPANT CLASSIFICATION SYSTEM

TECHNICAL FIELD

The present invention is directed to vision-based occupant classification in a motor vehicle, and more particularly to a classification method that is both fast and accurate.

BACKGROUND OF THE INVENTION

Occupant classification systems are commonly used in motor vehicles for determining if pyrotechnically deployed restraints such as air bags should be deployed in the event of a sufficiently severe crash. Early systems relied exclusively on sensors for measuring physical parameters such as seat force, but vision-based systems have become economically attractive due to the advent of low-cost solid-state imaging chips. However, image processing algorithms for accurately detecting and classifying vehicle occupants can be relatively complex, resulting in slower than desired response to changes in occupant position. The algorithms can be simplified to provide faster dynamic response time, but this typically impairs the classification accuracy. Accordingly, what is needed is a classification method having both high classification accuracy and fast dynamic response.

SUMMARY OF THE INVENTION

The present invention is directed to an improved method of operation for a vision-based occupant classification system, including a static classification routine for achieving highly accurate occupant classification, a dynamic detection routine for quickly responding to changes in occupant position, and a category state change routine for detecting potential changes in occupant category. The static classification routine determines an initial classification of the occupant, after which the dynamic detection routine monitors for changes in occupant position and the category state change routine monitors for a potential change in occupant category. If category state change routine detects a potential change in occupant category, the static classification routine is re-executed to re-classify the occupant. In a preferred embodiment, the category state change routine identifies a composite optical flow vector associated with occupant movement, and detects a potential change in occupant category when the composite flow vector crosses one or more pre-defined entry/exit motion gates.

DESCRIPTION OF THE PREFERRED EMBODIMENT

Figure 1:
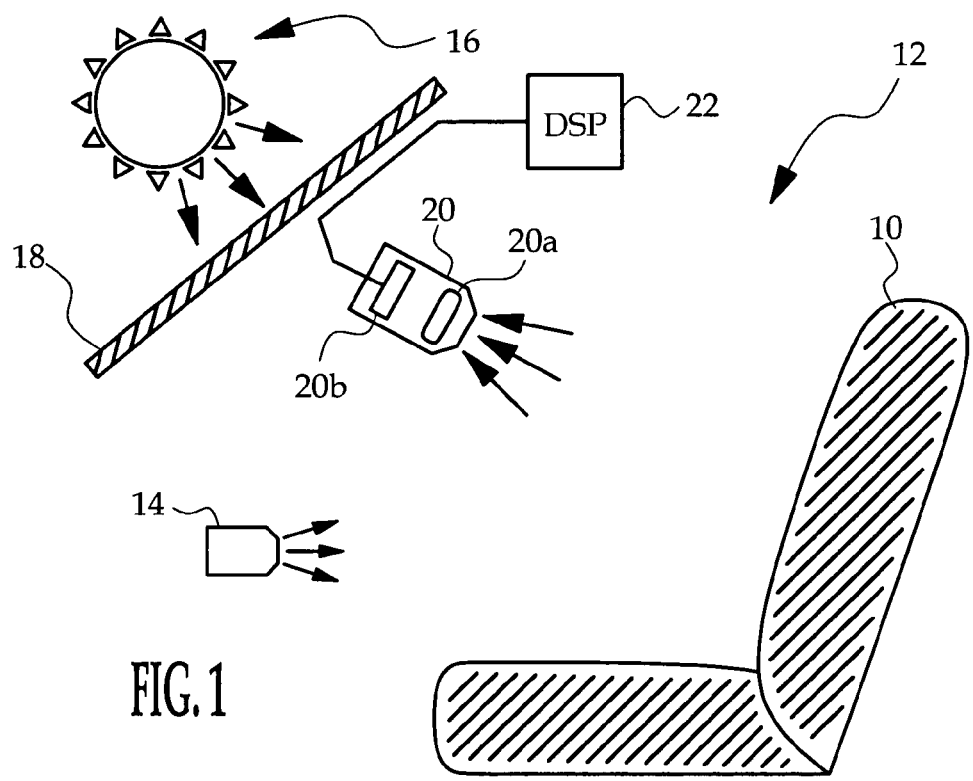
FIG. 1 is a diagram of a vehicle passenger compartment and vision-based occupant sensing system, including a digital camera and a microprocessor-based digital signal processor (DSP).

Referring to FIG. 1, the reference numeral 10 generally designates a passenger seat in a vehicle passenger compartment 12. The seat 10 is illuminated by both an active light source 14 and an ambient light source, as designated by the sun 16. The active light source 14 may be one or more light-emitting-diodes that emit light in a visible or near-infrared wavelength band from a location such as in the instrument panel or the interior rear-view mirror. The ambient light source may be solar as indicated, or may emanate from other sources such as roadside lights, and typically enters the compartment 12 through a window 18.

A vision-based occupant classification system includes the active light source 14, a digital camera (DC) 20 and a microprocessor-based digital signal processor (DSP) 22. Active and ambient light reflected from seat 10 and any occupant thereof is detected and imaged by digital camera 20, which typically includes an imaging lens 20a and a solid-state imaging chip 20b. The imaging chip 20b is a multi-pixel array that is responsive to the impinging light content, and creates a corresponding digital image. The DSP 22 typically functions to locate objects of interest in the image, such as occupants or infant car seats. For example, DSP 22 can be programmed to recognize the presence of a seat occupant, to classify the occupant, and to determine the position of a recognized occupant relative to an air bag deployment zone.

Figure 2:
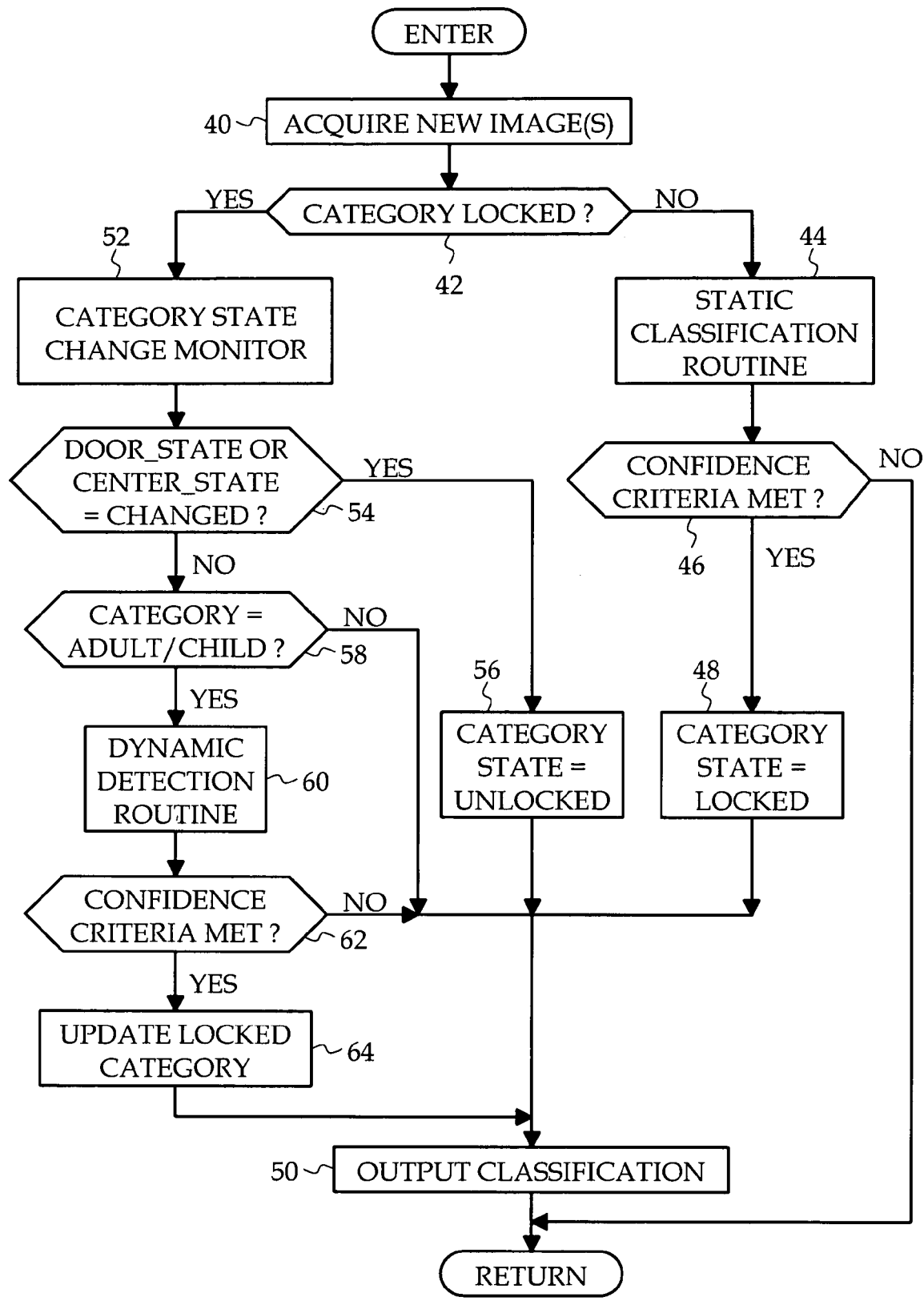
FIG. 2 is a main flow diagram representative of an algorithm architecture implemented by the DSP of FIG. 1 according to this invention, including a category state change routine.

The flow diagram of FIG. 2 depicts a routine executed by DSP 22 for carrying out the occupant classification method of the present invention. At block 40, DSP 22 acquires an image (or pair of images in the case of a stereo imager) from digital camera 20. Block 42 determines if the occupant category is locked—that is, if the occupant category has already been determined with high confidence. Initially, block 42 will be answered in the negative, and the static classification routine of block 44 is executed to determine the occupant category based on image(s) acquired at block 40. The static classification routine may be a complex algorithm capable of high accuracy occupant classification such as a trained neural network that takes into account image features such as object range, wavelet transform, intensity gradient edge, depth edge and others. These image features can be extracted from segmented images, rescaled images or certain regions of interest. The neural network produces a set of weighting parameters for the various possible occupant categories, and the weighting parameter can be normalized to form a confidence level. The outputs of the static classification routine include the category having the highest weighting parameter and its associated confidence level. This process can be relatively time-consuming, on the order of several seconds, but is required for highly accurate occupant classification. The block 46 subjects the output of block 44 to various predetermined criteria such as confidence level thresholds and requires that the predetermined criteria be met for at least a predetermined number of image frames. When the conditions of block 46 are satisfied, the block 48 is executed to set the category state to LOCKED (indicating that the occupant category has been determined with high confidence), and the block 50 is executed to output the determined occupant category. In the illustrated embodiment, the occupant categories include Empty Seat (ES), Rear-Facing Infant Seat (RFIS), Front-Facing Infant Seat (FFIS), Child (CH), and Adult (AD).

When the category state has been set to LOCKED, block 42 of the routine will be answered in the affirmative, and the blocks 52-64 will be executed to monitor for occupant motion indicative of a change in occupant position or a possible change in occupant category. The block 52 designates a routine for detecting potential category state changes. At the expense of additional hardware, this function may be accomplished with a seat force sensor, such as a fluid-filled seat bladder and pressure sensor, for example, where a potential state change is indicated by a substantial and persistent change in the measured pressure. According to the preferred embodiment of this invention, however, the category state change function is achieved by determining a composite optical flow vector from the acquired images, and producing a state change indication when the composite vector crosses one or more planes (referred to herein as gates) in passenger compartment space. For the front passenger seat 10, for example, the category state change monitor of block 52 defines a door gate between the seat 10 and the passenger door, and a center gate between the seat 10 and the driver seat. Trapezoidal representations of the door gate and center gate have been added to the photograph of FIG. 3, which corresponds to an acquired image of an adult occupant of a front passenger seat. The door gate detects occupant motion in or out of the vehicle door, while the center gate detects occupant motion between the driver and passenger seats. A routine for implementing the method is described below in reference to the graphs of FIG. 5 and the flow diagram of FIG. 6.

The category state change monitor of block 52 analyzes the acquired images to detect motion into or out of the vehicle through the front passenger door or motion from the back seats to the front seats or vice-versa. These motions when detected indicate a potential change in occupant category, whereupon the blocks 54 and 56 reset the category state to UNLOCKED. In a subsequent execution of the routine, the block 42 will be answered in the negative, and the static classification routine of block 44 will be executed until the confidence criteria of block 46 are met as described above.

If a category state change is not detected at block 54, the block 58 is executed to determine if the locked occupant category is Adult or Child. If so, the blocks 60-64 are executed to further classify the occupant based on position or orientation. For example, an adult or child occupant can be classified as being either in-position or out-of-position with respect to an air bag deployment zone. The position classification is determined by the dynamic detection routine of block 60, which can be a reduced function version of the static classification routine of block 44. For example, the dynamic detection routine of block 60 can be implemented with a trained neural network that takes into account only intensity gradient edge and wavelet transform. This process can be executed relatively quickly, on the order of 20 ms, because the basic occupant category (Adult or Child) is already known with high accuracy and confidence. As with the static classification routine of block 44, the dynamic classification routine of block 60 outputs a classification and its associated confidence level. In the illustration of FIG. 2, there are four possible outputs: In-Position Adult, Out-Of-Position Adult, In-Position Child, and Out-Of-Position Child. The confidence criteria of block 62 may be similar to those of block 46, and if such criteria are satisfied, the block 64 is executed to update the locked category. For example, the locked Adult category may be updated to locked Out-Of-Position Adult, and so forth. The block 50 is then executed to output the updated classification, completing the routine.

The above-described routine of FIG. 2 thus provides an algorithmic framework for delivering accurate initial occupant classification with fast dynamic response to changes in the position of a classified occupant. The relatively slow static classification routine (block 44) provides an accurate initial occupant classification and is only re-executed when the category state change monitor (block 52) detects a potential change in occupant category. Changes in the position of an occupant that has already been classified by the static classification routine (block 44) are quickly detected by the dynamic classification routine (block 60) without requiring re-execution of the static classification routine (block 44).

Figure 3:
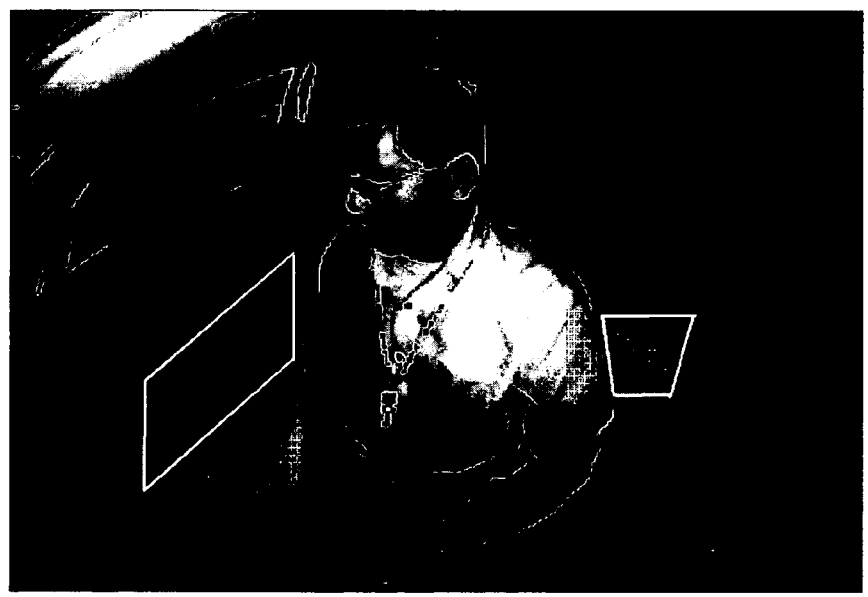
FIG. 3 is a photograph depicting an occupant image acquired by the digital camera of FIG. 1, along with door and center motion gates defined by the DSP of FIG. 1.

As indicated above, the preferred category state change monitor (block 52 of FIG. 2) detects potential changes in occupant category by determining a composite optical flow vector from the acquired images and detecting when the composite vector crosses a door gate or a center gate as depicted in the photograph of FIG. 3. Physically, the door and center gates each correspond to a set of pixels of imaging chip 20b. The pixels within each gate are evenly distributed across the gate, and the density of pixels within the gate can be set by calibration. Optical flow vectors within each gate can be calculated using, for example, the method described by Horn and Schunk at pages 185-204 of Artificial Intelligence, published in 1981, and incorporated herein by reference.

Figure 4A:
FIG. 4A is a photograph depicting an passenger compartment image acquired by the digital camera of FIG. 1, showing a person installing an infant car seat.
Figure 4B:
FIG. 4B is a blown-up portion of the photograph of FIG. 4A, showing the door gate and optical flow vectors defined by the DSP of FIG. 1.

Due to the unpredictable illumination patterns in the vehicle environment and various aberrant occupant motions such as hand waving, the detected motion can be quite complex, resulting in optical flow vectors that do not align with a primary axis of motion. This is illustrated in the photographs of FIGS. 4A-4B for the situation where an infant car seat is carried into the passenger compartment 12 through a passenger door and placed on the front passenger seat 10. The photograph of FIG. 4A depicts an image acquired by digital camera 20 when the infant car seat breaks the plane of the door gate, and the photograph of FIG. 4B is a close-up version of the door gate, where small arrows have been superimposed on the door gate to depict the various individual optical flow vectors produced by the category state change monitor.

According to this invention, the category state change monitor sums all of the calculated optical flow vectors (using standard vector addition techniques) to form a single composite flow vector. When significant motion exists in the pixels defining a given motion gate, the majority of the optical flow vectors have large magnitudes and similar directions. Errant vectors and vectors from off-axis motion constitute a small minority of the vectors; such vectors typically point in different and opposing directions and tend to cancel out in the vector addition process. As a result, the magnitude and direction of the composite flow vector is highly tolerant of the uncontrolled variations in lighting and motion that typically occur in a vehicle passenger compartment.

Figure 5:
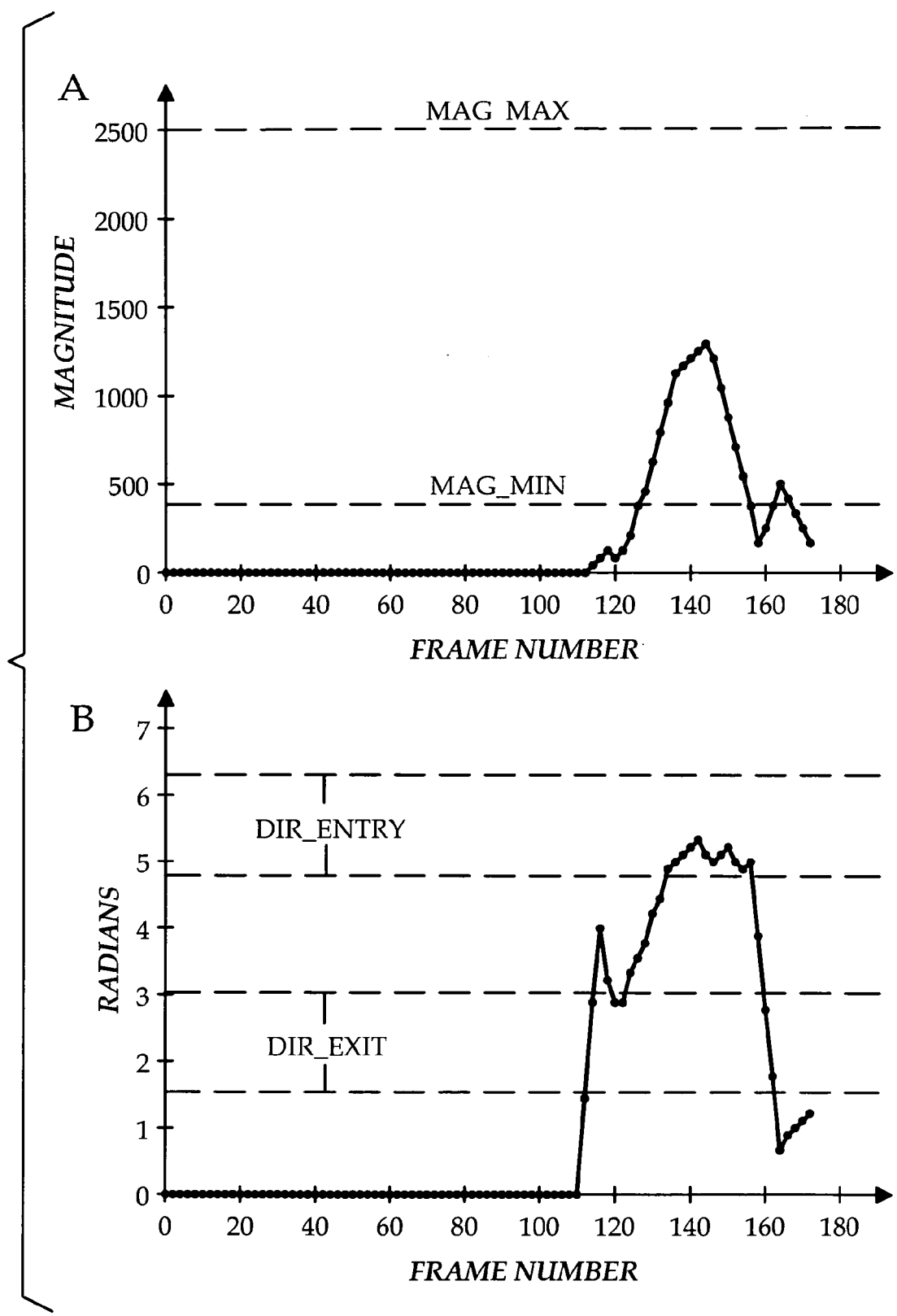
FIG. 5 graphically depicts detection of potential change in occupant category according to this invention. Graphs A and B respectively depict magnitude and direction of a composite of the optical flow vectors depicted in FIG. 4B.

The magnitude and direction of the composite optical flow vector for the illustration of FIGS. 4A-4B are respectively depicted in graphs A and B of FIG. 5 over the course of numerous image frames spanning an interval of about six seconds. Graph A depicts a pair of calibrated magnitude thresholds MAG_MAX and MAG_MIN defining a vector magnitude of interest; vector magnitudes below MAG_MIN are deemed to indicate insignificant motion, and vector magnitudes above MAG_MAX are too high to represent a person or object of interest entering or exiting the vehicle. If the composite vector magnitude is between MAG_MIN and MAG_MAX, the category state change monitor determines if the vector direction is consistent with a change in occupant category. Graph B depicts two pairs of calibrated thresholds defining vector directions of interest with respect to a polar coordinate system overlaying the door gate. In the illustrated coordinate convention, a composite vector direction within a window DIR_ENTRY centered on 5.5 radians corresponds to vehicle entry motion, while a composite vector direction within a window DIR_EXIT centered on 2.35 radians corresponds to vehicle exit motion. If the vector magnitude condition described in respect to Graph A is met, and the vector direction within one of the predefined windows is sustained for a predetermined number of successive frames, the category state change monitor signals the occurrence of an occupant state change. Motion within each gate is evaluated independently with gate-specific thresholds, and the thresholds are preferably calibrated to err in favor of state change detection.

Figure 6:
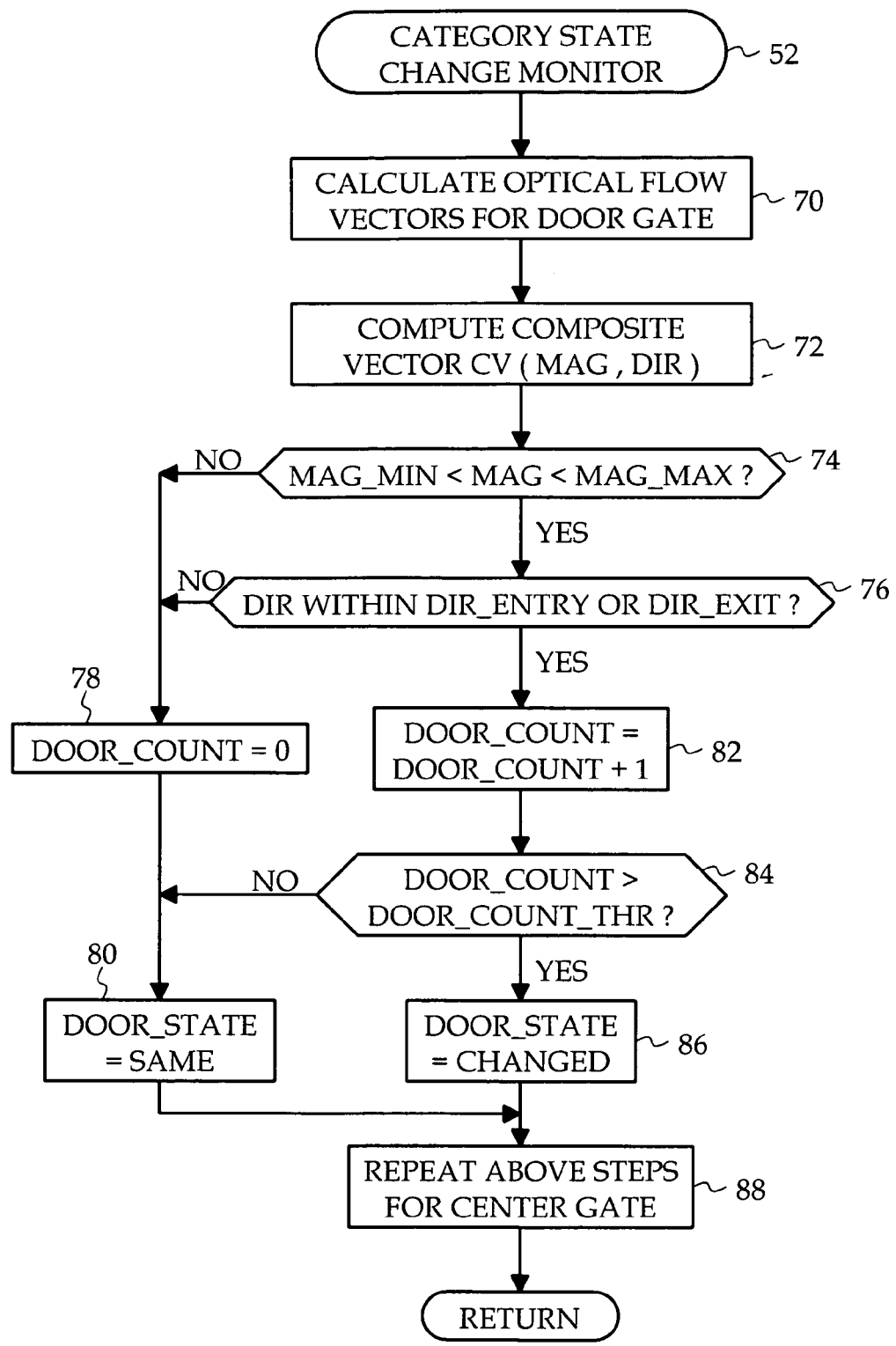
FIG. 6 is a flow diagram detailing the category state change routine of FIG. 2.

The flow diagram of FIG. 6 illustrates the above-described method of monitoring occupant category state changes, and corresponds to the block 52 of FIG. 2. Blocks 70-86 are executed for the door gate, and are then repeated for the center gate as indicated at block 88. The optical flow vectors within the door gate are computed at block 70, and summed to form a composite flow vector at block 72. Block 74 determines if the magnitude MAG of the composite vector is with the thresholds MAG_MIN and MAG_MAX, and block 76 determines if the direction DIR of the composite vector is within the defined entry or exit windows DIR_ENTRY, DIR_EXIT. If at least one of the conditions is not met, the blocks 78 and 80 are executed to reset a counter variable DOOR_COUNT to zero and to set the flag DOOR_STATE to SAME, whereafter the process is repeated for the center gate. If the conditions of blocks 74 and 76 are both satisfied, the block 82 is executed to increment the counter variable DOOR_COUNT. So long as DOOR_COUNT is less a calibrated threshold DOOR_COUNT_THR, the block 84 and 80 maintain the DOOR_STATE flag at SAME and the process is repeated for the center gate. If and when DOOR_COUNT is incremented to DOOR_COUNT_THR due to a composite vector that is sustained over a predefined number of image frames (i.e., a predetermined interval), the block 86 sets the DOOR_STATE flag to CHANGED. Referring back to the flow diagram of FIG. 2, the blocks 54-56 set the category state to UNLOCKED if the DOOR_STATE or CENTER_STATE flags are set to CHANGED, triggering re-execution of the static classification routine to re-classify the occupant of seat 10.

In summary, the present invention provides an improved method of operation for vision-based occupant classification that provides both highly accurate classification and fast dynamic response to occupant movement. Additionally, the invention provides a method of using acquired vision images to detect potential occupant state changes, avoiding expenses associated with seat sensor devices and their installation in the vehicle. While the invention has been described in reference to the illustrated embodiment, it should be understood that various modifications in addition to those mentioned above will occur to persons skilled in the art. Accordingly, it is intended that the invention not be limited to the disclosed embodiment, but that is have the full scope permitted by the language of the following claims.

The invention claimed is:

1. A method of operation for vision-based occupant classification in a vehicle cabin, comprising the steps of:
   producing a series of digital images of a region of said cabin that includes a vehicle seat;
   executing a static classification routine that processes the produced digital images to detect and classify an occupant of said seat;
   once said static classification routine has detected and classified the occupant of said seat, suspending further execution of said static classification routine, and instead executing a dynamic detection routine that processes the produced digital images to detect a change in position of the detected occupant;
   executing a category state change routine following the suspension of said static classification routine for detecting a potential change in an occupant category of said seat; and
   if said potential change in occupant category is detected by said category state change routine, suspending further execution of said dynamic detection routine and said category state change routine, and instead re-executing said static classification routine to re-detect and re-classify the occupant of said seat.

2. The method of operation of claim 1, wherein said static classification routine produces an empty seat classification if said seat is empty and an infant seat classification if said seat is occupied by an infant or child car seat, and said method includes the step of:
   inhibiting the execution of said dynamic detection routine if said static classification routine produces said empty seat classification or said infant seat classification.

3. The method of operation of claim 1, where an execution time of said dynamic detection routine is significantly shorter than an execution time of said static classification routine.

4. A method of operation for vision-based occupant classification in a vehicle cabin, comprising the steps of:
   producing a series of digital images of a region of said cabin that includes a vehicle seat;
   processing the produced digital images to detect and classify an occupant of said seat;
   once the occupant of said seat has been detected and classified, processing the produced digital images to detect a change in position of the identified occupant;
   detecting a potential change in an occupant category of said seat; and
   repeating the step of processing the produced digital images to re-detect and re-classify the occupant of said seat when said potential change in occupant category is detected.

5. The method of operation of claim 4, where the step of detecting a potential change in an occupant category of said seat includes the steps of:
   defining at least one motion gate adjacent said seat;
   processing a region of the produced digital images that corresponds to said motion gate to identify object movement in said region;
   determining a composite movement vector from the identified object movement; and
   detecting a potential change in the occupant category when said composite movement vector is indicative of occupant movement to or from said seat.

6. The method of operation of claim 5, including the steps of:
   computing optical flow vectors in said region; and
   summing said optical flow vectors to produce said composite movement vector.

7. The method of operation of claim 5, including the steps of:
   detecting a potential change in the occupant category when a direction of said composite movement vector is in a direction window indicative of movement to or from said seat and a magnitude of said composite movement vector is within a predefined range of magnitudes indicative of a change in occupant category.

8. The method of operation of claim 7, including the steps of:
- measuring a duration for which the direction of said composite movement vector is in said direction window and the magnitude of said composite movement vector is within said predefined range of magnitudes; and
- detecting a potential change in the occupant category when the measured duration exceeds a reference duration.

9. The method of operation of claim 5, wherein said at least one motion gate is between said seat and a vehicle door adjacent said seat.

10. The method of operation of claim 5, wherein said at least one motion gate is between said seat and an adjacent seat in said cabin.

* * * * *